(12) United States Patent
Nagampalli et al.

(10) Patent No.: US 7,979,865 B2
(45) Date of Patent: Jul. 12, 2011

(54) IDENTIFYING SEPARATE THREADS EXECUTING WITHIN A SINGLE PROCESS

(75) Inventors: Narasimha Rao S. S. Nagampalli, Kirkland, WA (US); Pradeep Bahl, Redmond, WA (US); Ramesh Chinta, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1651 days.

(21) Appl. No.: 11/266,506

(22) Filed: Nov. 3, 2005

(65) Prior Publication Data
US 2007/0101335 A1  May 3, 2007

(51) Int. Cl.
G06F 9/46 (2006.01)
(52) U.S. Cl. ........................................ 718/108
(58) Field of Classification Search .................. None
See application file for complete search history.

(56) References Cited

U.S. PATENT DOCUMENTS

| | | | | |
|---|---|---|---|---|
| 5,632,032 A * | 5/1997 | Ault et al. | ...................... | 718/100 |
| 5,892,944 A * | 4/1999 | Fukumoto et al. | ............ | 718/100 |
| 6,088,451 A | 7/2000 | He | | |
| 6,134,591 A | 10/2000 | Nickles | | |
| 6,279,111 B1 * | 8/2001 | Jensenworth et al. | .......... | 726/10 |
| 6,418,442 B1 * | 7/2002 | Dwyer, III | ..................... | 707/747 |
| 6,625,603 B1 * | 9/2003 | Garg et al. | ..................... | 707/758 |
| 7,139,894 B1 * | 11/2006 | Mensching et al. | .......... | 711/170 |
| 7,594,236 B2 * | 9/2009 | Jiang et al. | ..................... | 719/313 |
| 7,703,081 B1 * | 4/2010 | Buches | ......................... | 717/127 |
| 2002/0099952 A1 * | 7/2002 | Lambert et al. | ............... | 713/200 |
| 2003/0051026 A1 | 3/2003 | Carter | | |
| 2003/0149895 A1 * | 8/2003 | Choo et al. | ..................... | 713/201 |
| 2005/0138130 A1 * | 6/2005 | Pilkington | .................... | 709/206 |
| 2006/0123087 A1 * | 6/2006 | Gibson | ......................... | 709/206 |
| 2006/0259487 A1 * | 11/2006 | Havens et al. | ..................... | 707/9 |
| 2006/0259980 A1 * | 11/2006 | Field et al. | ....................... | 726/27 |
| 2006/0294051 A1 * | 12/2006 | Kapadia et al. | ................... | 707/1 |

* cited by examiner

*Primary Examiner* — Van H Nguyen
*Assistant Examiner* — Adam Lee
(74) *Attorney, Agent, or Firm* — Wolf, Greenfield & Sacks, P.C.

(57) ABSTRACT

A computer-readable medium bearing computer-executable instructions which, when executed on a computer, carry out a method for handling a request for an operating system service is presented. The method comprises receiving a request for execution of an operating system service. The corresponding operating system service is then identified. A unique service identifier that corresponds to the requested operating system service is obtained. A service thread is generated, the thread being associated with an executing process. Storage associated with the service thread is initialized with the unique service identifier. Thereafter, the execution of the service thread is initiated.

14 Claims, 6 Drawing Sheets

IDENTIFYING SEPARATE THREADS EXECUTING WITHIN A SINGLE PROCESS

BACKGROUND

Operating systems, especially those directed to personal computers, have made substantial sophisticated and technological advances in a relatively short period of time. These advances have corresponded to advances in computer processing technology, such as hardware process switching, multi-tasking, multi-threading, and the like. Whereas on generations of personal computers their operating system supported one user process in which a user could execute one program at a time, in current operating systems, multiple programs and processes execute simultaneously or, at least, in an apparently simultaneous manner, taking advantage of the abilities of the hardware as well as advanced programming techniques.

As those skilled in the art will appreciate, in order to manage the execution of programs or modules on a computer, each program executes with a predefined structure, imposed by the operating system, which is referred to hereafter as a process. Of course, each operating system designed is free to name its structures as desired. As such, some operating systems refer to their structures as tasks, while others may have yet other names. Thus, for the sake of clarity, the term process defines the fundamental structure used by an operating system to execute a software module. A process contains the resources (e.g., memory, register values, stack space, temporary disk space, communication channels, and the like) that are requested by an application and allocated to it by the operating system. Thus, in a multi-processing (or multi-tasking) operating system, multiple programs or modules may be running simultaneously.

Another advance in operating system technology (which generally also corresponds to advances in computer hardware technology), is the use of threads. As is well known in the art, programs are now written such that multiple aspects of the program may be executing simultaneously. This is especially true, though not the exclusive domain, of programs structured and written to take advantage of numerous object-oriented programming functionalities. Unlike a process, a thread represents a unit of execution for a given process. Generally speaking, while a process represents a "job" that an operating system performs, a thread represents one of a potentially many sub-tasks necessary to complete the job. Moreover, when a process is created, it is created with a main thread. Subsequently, that main thread may create other threads for multiplexing various sub-tasks.

The thread construct is very lightweight with regard to system resources. It has an execution context, but very little else. This is in contrast to the process, which is allocated all of the resources necessary to execute the program, as well as the resources requested by the program. The thread, being a unit of execution of a process, has access to the resources allocated to the process. There is a one to many relationship between processes and threads: each process has one or more threads or execution points.

As is well known in the art, operating systems provide a wide array of services to a user. These services include broad categories such as, but not limited to, file I/O, communication and/or networking services, graphics display services, timers, peripheral interfaces, and the like. Indeed, a quick check of processes and threads executing on an "idle" computer system, i.e., one in which the user has not executed any application, reveals that the computer system, in fact, is running many processes. Many services, including operating system services, are running even on an "idle" computer.

Generally, operating system developers are keenly aware that processes take up more system resources than do threads. They are further aware that if they are to provide a process for each service that must execute on an operational system, the amount of resources that would be required is staggering. Moreover, there would be significant performance issues due to the overhead of scheduling a process corresponding to each service. To compensate, at least some operating system providers group various operating system services into a single process. These processes have multiple entry points, each entry point corresponding to a service provided by the operating system which will be executed by a thread. In this manner, the operating system provider can continue to offer its wide variety of services to other applications operating on the computer system without incurring substantial resource or performance overhead for each service available. Microsoft Corporation's Windows family of operating systems, such as Windows XP, combines multiple operating system services into a single process, where each service is executed by one or more threads associated with the process.

When instantiating a process, the operating system will allocate the resources necessary for the corresponding program to run, and also load at least a portion of the program into memory. However, the entire program need not be loaded, especially when the program is large and is broken into various modules or libraries. When code in those libraries is needed, a fault is generated which causes them to be loaded into memory, and then execution continues. Operating system services are frequently implemented such that if they are requested, the code corresponding to that service is loaded into the process and a thread begins execution at the requested entry point.

One aspect of processes is that the operating system assigns each process a unique identifier. These process identifiers (PIDs) are useful for a variety of reasons, and especially when tracking/tracing the execution of the processes on the computer system. Tracking or tracing processes executing on the computer system are frequently performed to identify bottlenecks in the computer system, perform system modeling, identify which processes are performing which actions (such as identifying a rogue process that opens unsecured ports on the computer), and the like.

Operating system services are the frequent target of malware—malicious software whose intent is to corrupt, destroy, perform identity theft, or otherwise harm the computer or the computer user. Malware includes Trojan horses, worms, bots, and viruses that individually or collectively subject a computer or computer network to various types of attacks, both internal and external, resulting in data and identity thefts, loss of data, denial of service attacks, and the like. Quite often it is the object of malware to first corrupt one or more operating system services on a computer system. Once a service is corrupted, a request is made to the corrupt service which is then loaded into an executing process and a thread begins execution of that service. Once executing, the computer system is compromised, vulnerable to the malware's ill intent.

One novel way to ensure that operating system components are not corrupted, or, if they do become corrupted, that the operating system components are prevented from further compromising the computer system, is to ensure that an operating system component executes within prescribed bounds. This is sometimes referred to as "hardening" the operating system component, and may be applied to non-operating system components as well. When a hardened operating system component executes instructions outside of its prescribed bounds, it is viewed as a rogue, or corrupted, operating system component and any activity it performs that falls outside of those prescribed bounds is blocked, or alternatively, an alert is generated to an administrator prompting an inquiry into its behaviors.

Component hardening relies on the ability to identify the component, and relate the identified component to a set of rules specifying what is allowable and/or what is not allowable. More particularly, component hardening relies upon one or more unique security identifiers assigned to a component being identified as being responsible for operations conduction by the component. It is through these security identifiers that an operating system can relate the identified component to its particular set of rules. Unfortunately, currently, identification of an individual service conducting an operation in a process with multiple services is not possible. Thus, service hardening is currently based on an aggregated set of security rules associated with each service in the process. Of course, this means that the least restrictive set of rules is used to harden all of the services in a process.

Clearly, each operating system service, if it is to be hardened, will have its own set of activities identifying what it can and cannot do. A process may contain operating system services with similar or vastly different prescribed behaviors. Though an effort could be made to group operating system services with similar behavioral rules into a process, there will still likely be differences. Conversely, for various reasons, it may be necessary to group operating system services having vastly divergent behavioral rules into a single process, such as when a system is constrained by memory or CPU processing power issues, such as found with small form-factor devices, or when the system is hosting multiple services as a multi-functional server. As the only current way to identify executing code to a set of rules is through a security identifier associated with a process, and as multiple operating system services (potentially having vastly different rules) are collected into a single process, it is difficult or impossible to determine which operating system service (of many that may be assigned to a given process) is executing. The implications are that an individual service's hardening can not be enforced when it shares the process space with other services. Since only the process can be identified as taking action, the hardening rules for the services aggregated into the process must be less restrictive than they would be if each individual operating system service were placed in its own process. Put another way, to harden an operating system process containing multiple operating system services, the process must currently adopt a single set of hardening rules. Moreover, this single set of hardening rules is a combination of the least restrictive rules of the services. Unfortunately, this means that some operating system services in a process are given more "privileges" than they would normally be allowed. As such, their corruption still poses a significant threat to the computer system, even when the process is "hardened."

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computer-readable medium bearing computer-executable instructions which, when executed on a computer, carry out a method for handling a request for an operating system service, is presented. The method comprises receiving a request for execution of an operating system service. The corresponding operating system service is then identified. A unique service identifier that corresponds to the requested operating system service is obtained. A service thread is generated, the thread being associated with an executing process. Storage associated with the service thread is initialized with the unique service identifier. Thereafter, the execution of the service thread is initiated.

A computer system for assigning thread identifiers to threads executing on behalf of an executing process is also presented. The computer system comprises a processor and memory. The computer system also includes an operating system and a service control manager. The operating system comprises a plurality of operating system services which may be loaded into an executing process and executed as a thread for the executing process. The services control manager, in response to a request for the execution of an operating system service, identifies the requested operating system service. Thereafter, the services control manager generates a service thread for execution in connection with the executing process. Further, the services control manager initializes storage associated with the service thread with the unique service identifier. Thereafter, the service thread is executed.

A computer-implemented method for determining whether a service thread executing an operating system service, that is loaded into an executing process, has permission to perform some of the actions is provided The method comprises each of the following as executed by a computer. Metadata from the service thread is obtained. A determination is made as to whether the metadata includes a service identifier, and if so, the service identifier is obtained as the obtained identifier. An access control list is obtained, the access control list corresponding to the obtained identifier. An evaluation is made to determine whether the operating system service is allowed to perform the specific action. If it is determined that the service thread is allowed to perform the specific action according to the access control list, the action is permitted.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

As mentioned above, FIG. 1 is a pictorial diagram illustrating an exemplary computer 100 suitable for initializing threads executing within an executing process with a service identifier. While the exemplary computer 100 and its components are described as a personal computer, as will be readily recognized by those skilled in the art, a suitable computer may be any one of a number of computing devices which support multiple threads per process including, but not limited to, mini- and/or mainframe computers, personal computers, notebooks or laptop computers, tablet computers, personal digital assistants (PDAs), and the like.

Figure 1:
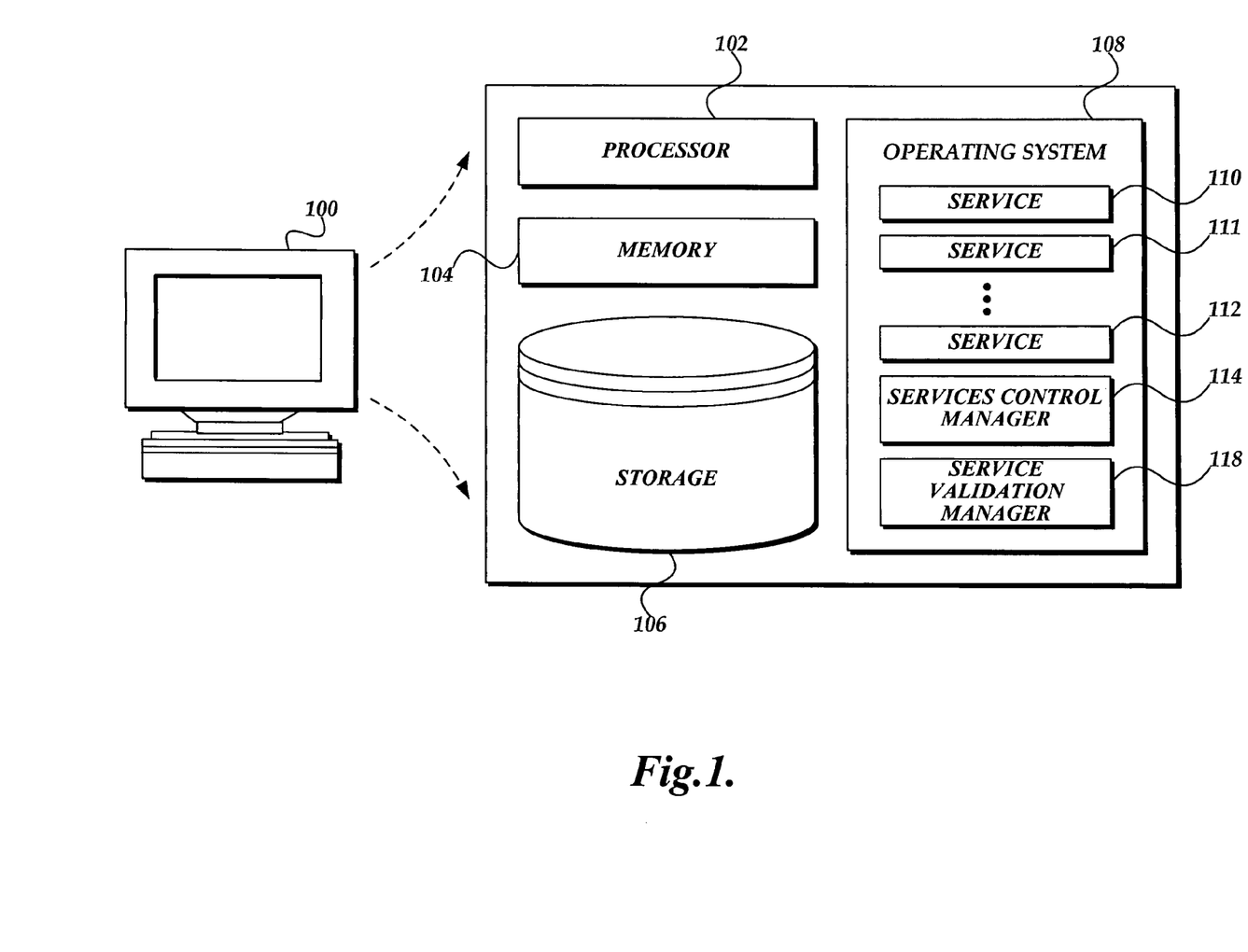
FIG. 1 is a pictorial diagram illustrating an exemplary computer 100 suitable for initializing threads executing within an executing process with a service identifier.

The computer 100 includes a processor 102 and a memory 104. The computer 100 is also shown as including a storage device 106, such as a disk drive. Of course, those skilled in the art will appreciate that in some computing devices only memory is used, including a combination of volatile and/or non-volatile memory. As will be discussed in greater detail below, access control lists associated with individual operating system services are stored on the storage device 106 or in memory 104.

Stored in either the memory 104 or the storage device 106 is the computer's operating system 108. As those skilled in the art will appreciate, various portions of the operating system 108 are loaded into memory 104 for execution by the processor 102. Additionally, those skilled in the art will readily appreciate that the operating system 108 includes numerous components. However, for purposes of the present discussion, the operating system 108 is illustrated as comprising one or more operating system services, including services 110-112. In addition to the operating system services, the operating system 108 includes a services control manager 114 and a service validation manager 118. The services control manager 114 is responsible for loading a requested operating system service into an executing process and allocating a thread to that service for the service's specific execution. The service validation manager 118 is responsible for validating whether an operating system service, such as service 110, is authorized to perform a particular action as a result of its execution by the processor 102. As those skilled in the art will appreciate, the operating system, including the operating system services 110-112, the services control manager 114, and service validation manager 118, may be delivered to a computer on tangible computer-readable medium, including, but not limited to, one or more CD-ROM disks, one or more DVD disks, floppy disks, and the like. Moreover, in one embodiment, the operating system is a Microsoft Windows operating system.

Figure 2:
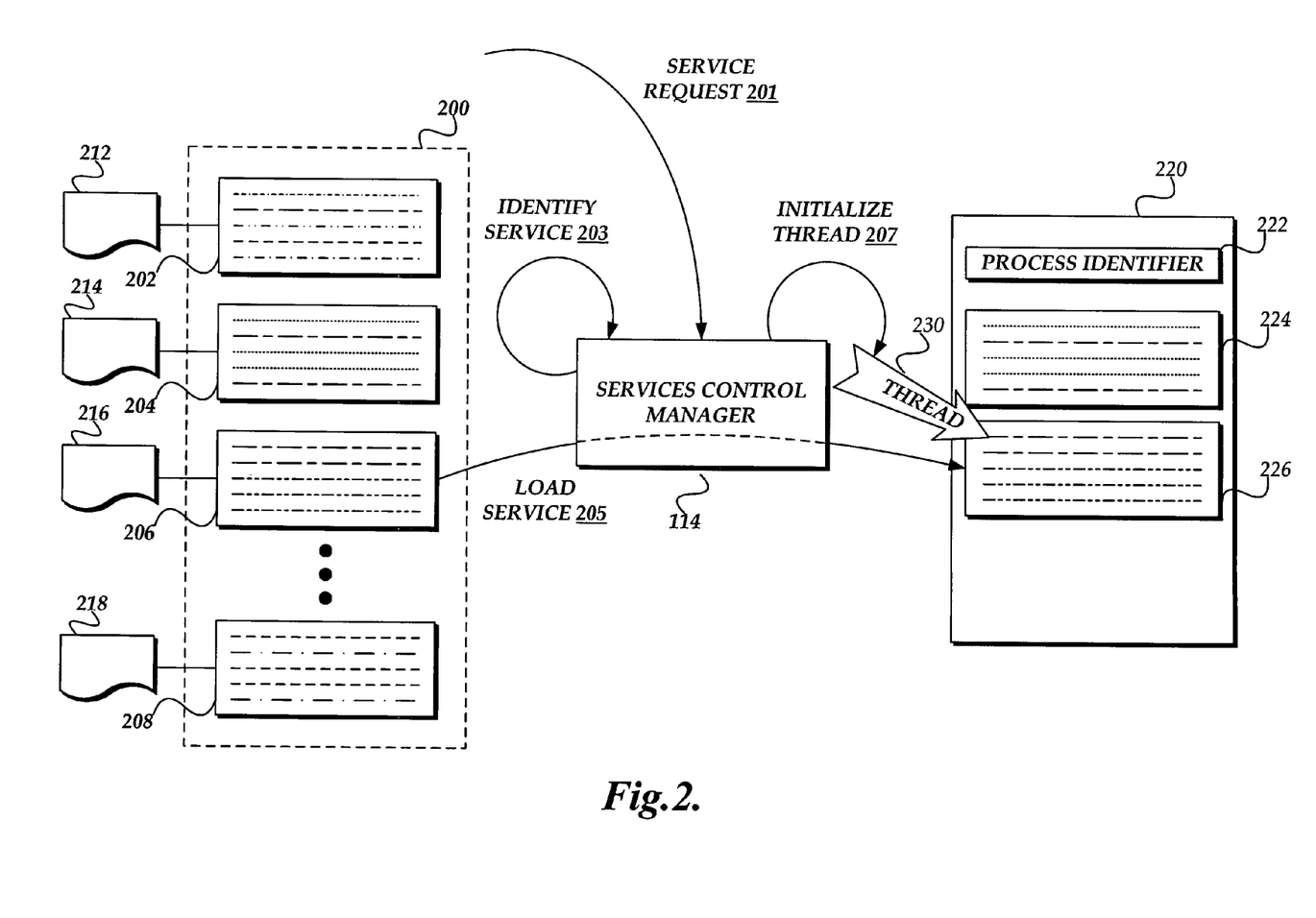
FIG. 2 is a pictorial diagram for illustrating the processing of a request for a service including loading the service in an executing process, assigning a thread to the service, and executing the service via the thread.

With regard to loading a process with the code of a requested service and allocating a thread to that service, FIG. 2 is a pictorial diagram illustrating exemplary components on a computer system for providing thread identifiers to threads operating on services in a process. As shown in FIG. 2, a collection of operating system services 200, including services 202-208, are available for use in a computer system. Each of the resources, such as files, registry keys, network ports, network addresses, and the like, that is accessed by a service, may be associated with an access control list (ACL), 212-218, respectively. Each ACL identifies the actions that are permissible on a resource for the associated operating system service. If an operating system service is allowed certain access on a resource, such as open, read, or write, then the ACL on that resource will have one or more Access Control Entries (ACEs) that specify the above access for the service. For example, ACL 212 identifies the actions that can be performed by operating system service 202. Providing an ACL for each resource accessed by an operating system service such that a service validation manager 118 can determine whether or not a particular action is permissible for that service is referred to as "hardening" the operating system service, i.e., hardening the service such that it is resistant to corruption. The service, if infected, will not be allowed by the service validation manager 118 to violate the bounds set by the ACLs on the resource that is accessed. Thus, it is "hardened," and by implication, the operating system is also hardened.

As those skilled in the art will appreciate, not all operating system services are used in a given session. Only when those services are requested does the services control manager 114 load the service into a process. More particularly, when service request 201 is received by the services control manager 114, the services control manager identifies which service is actually requested (as indicated by 203). This request 201 may correspond to an operating system service that is already executing in a process on the computer system, and the services control manager 114 simply communicates with a thread corresponding to that service in the process, as will be described below. However, assuming that the operating system service is not currently loaded and/or executing, the services control manager 114 identifies which operating system service corresponds to the request, such as service 206, and loads the service, as indicated by 205, into an executing process 220. The loaded service is shown as service 206'.

Of course, other services may also be operating within the process 220. For example, process 220 is shown as also including operating system service 224. This, however, should be viewed as illustrative only, and not construed as limiting upon the present invention.

Once the requested operating system service 206' is loaded into the process 220, the services control manager 114 initiates execution on the service by creating a thread 230 and initializing the thread with metadata corresponding to the service, as indicated by arrow 207. It is in this initialization that the services control manager 114 determines a unique service identifier (SID) corresponding to the operating system service and stores the SID in the metadata area of the allocated thread 230. Once the thread 230 is initialized with the SID, the services control manager begins its execution on the loaded code.

As will be discussed below, when a thread, such as thread 230, does not have an SID in the metadata, the service validation manager 118, which is used to ensure that services perform actions within the set of permissible actions as defined by an ACL, will turn to the process's ACL as determined by the process's identifier 222.

Figure 3:
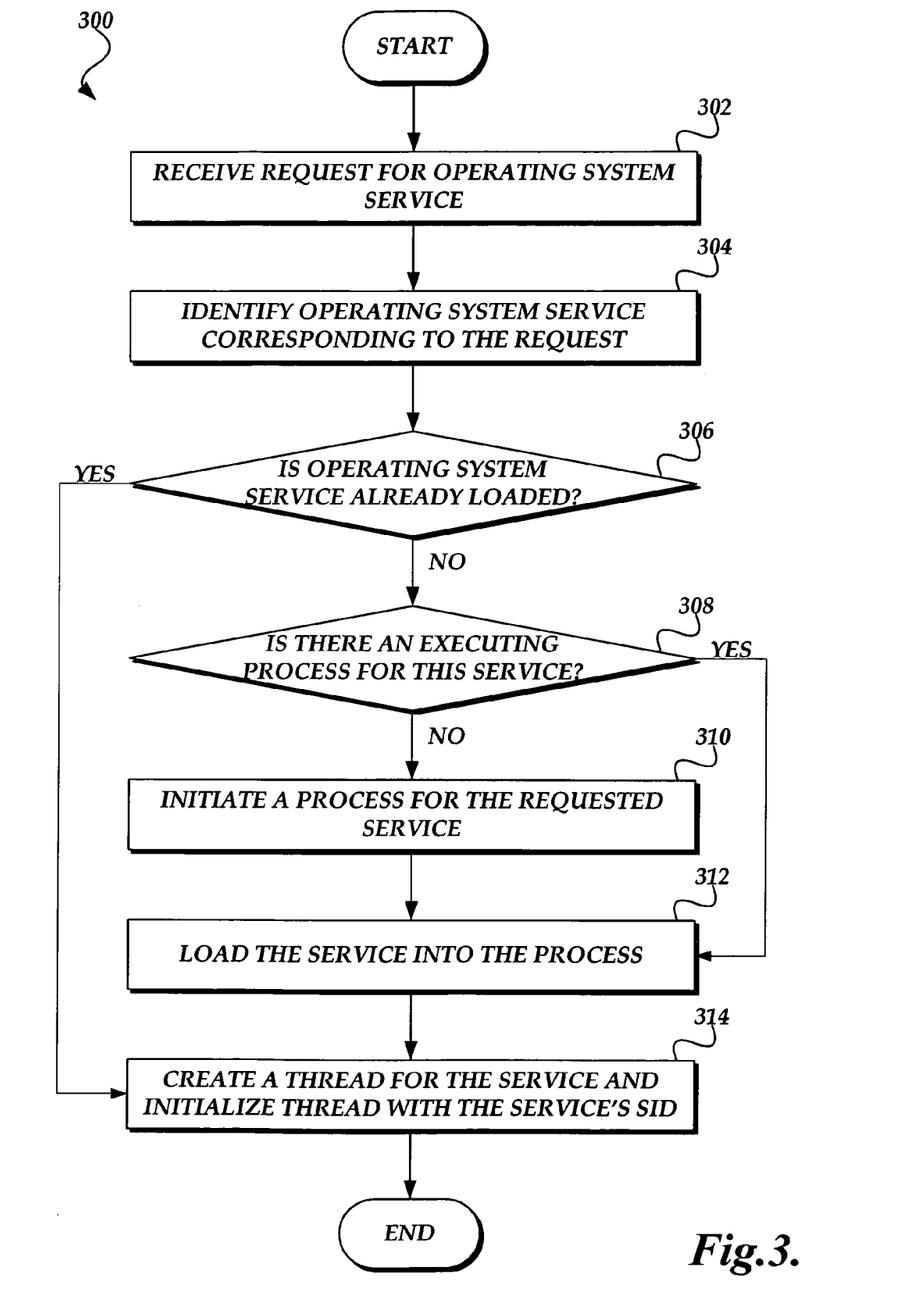
FIG. 3 is a flow diagram illustrating an exemplary routine for processing a request for an operating system service.

While aspects of loading an operating system service and initializing it with an SID were generally described in FIG. 2, a more formal description of this process is set forth in regard to FIG. 3. More particularly, FIG. 3 is a flow diagram illustrating an exemplary routine 300 for processing a request for an operating system service. Beginning at block 302, the request for the operating system service is received by the services control manager 114. At block 304, the services control manager 114 identifies the operating system service corresponding to the request.

At decision block 306, a determination is made as to whether the operating system service is already loaded into an executing process. If the operating system service is already loaded into an executing process, the routine proceeds to block 314 described below. Alternatively, if the operating system service is not already loaded into an executing process, the routine proceeds to decision block 308. At decision block 308, a determination is made as to whether there is an executing process in which the requested service may be loaded. If there is no process, at block 310, the services control manager 114 initiates an executing process for the requested operating system service. Thereafter, or if there was an executing process for the operating system service, the routine 300 proceeds to block 312.

At block 312, the services control manager 114 loads the operating system service into the process for execution. At block 314, the services control manager 114 creates a thread for execution on the operating system service, including initializing the thread (or its metadata) with the operating system service's SID such that all or some of its actions can be compared against a corresponding ACL by the service validation manager 118. Thereafter, the routine 300 terminates.

Figure 4:
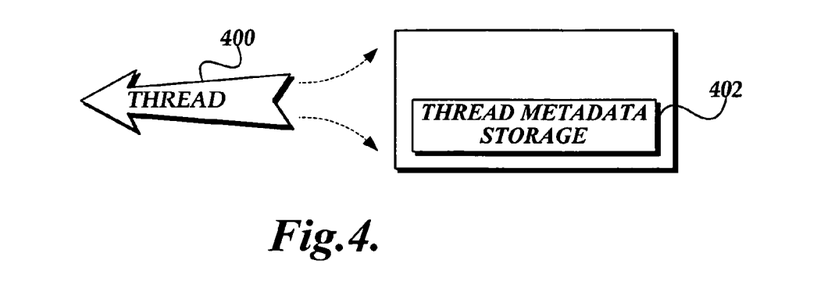
FIG. 4 is a block diagram illustrating exemplary components of a service thread suitable for storing a service identifier.

FIG. 4 is a block diagram illustrating exemplary components of a service thread suitable for storing a service identifier. More particularly, as indicated above, an exemplary thread 400 includes a field of metadata 402. The services control manager 114 stores the SID of service into the metadata when the thread 400 is assigned to a service. Of course, the services control manager 114 is not the only component which generates a thread. Quite frequently, an executing thread will create other threads to assist in its execution. Depending on configurations, a current thread can create another thread and, in so doing, assign the newly created thread's metadata the values stored in the creating thread's metadata.

Figure 5:
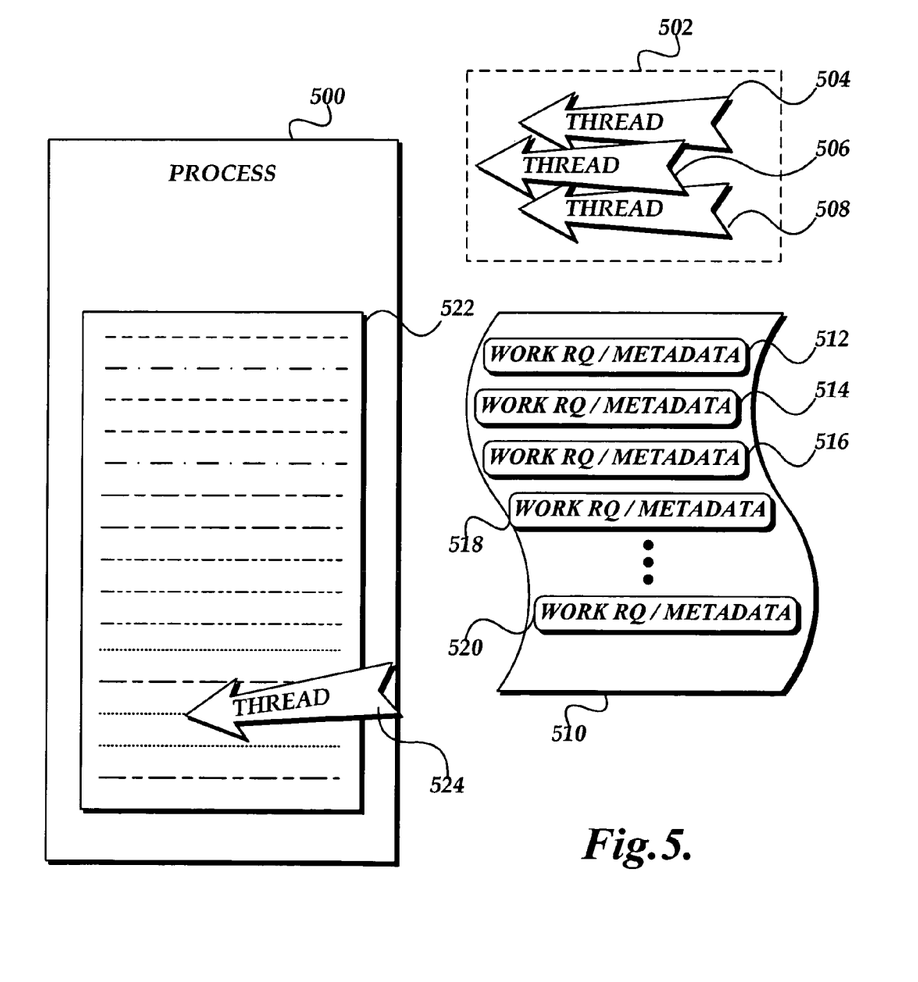
FIG. 5 is a pictorial diagram for illustrating a process utilizing a thread pool to service thread requests and for assigning service identifiers to threads allocated to the service from the thread pool.

As an alternative to each thread creating a new thread to complete a cooperative task, quite frequently processes are configured such that there are worker threads available, in a so-called thread pool. FIG. 5 is a pictorial diagram for illustrating a process utilizing a thread pool to service thread requests and to assign service identifiers to threads from the thread pool. In particular, process 500 includes an operating system service 522 upon which thread 524 is executing. Process 500 also includes a thread pool 502 including threads 504-508, and a work request queue 510. When service 522 comes to a point in execution where it would be advantageous to have an additional thread executing, service 522 queues a work request, such as work request 512, with the process 500. The process 500 is operating such that as its worker threads, i.e., the threads in the thread pool 502, become available, a work request from the work request queue 510 is taken up and a worker thread assigned to the service that submitted the request. As such, typically the work request will include information identifying the requesting thread, such as the requesting thread's metadata. This information is used by the worker thread to initialize itself and begin its execution for the requesting thread. In this manner, the SID of the requesting thread is copied to the worker thread such that for actions of the worker thread, the service validation manager 118 can determine whether actions performed by the worker thread are authorized according to the resource's ACL.

Figure 6:
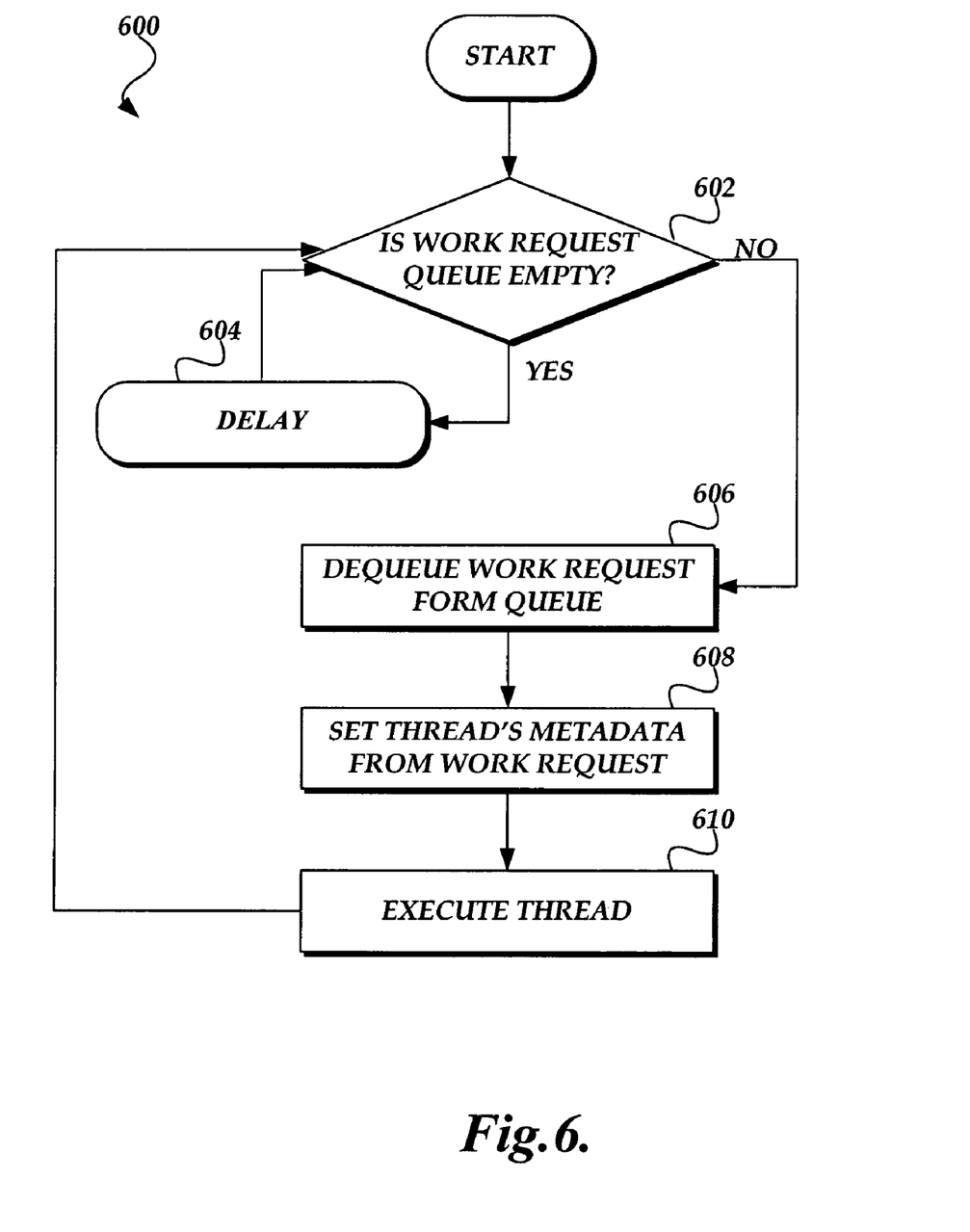
FIG. 6 is a flow diagram illustrating an exemplary routine for use by an executing process to handle work requests from threads and assigning a service identifier to threads assigned to the work requests.

FIG. 6 is a flow diagram illustrating an exemplary routine 600 for use in an executing worker thread in process 500 of FIG. 5, to handle work requests from threads and assign a service identifier to itself. Beginning at decision block 602, a determination is made as to whether the work request queue 510 is empty. If it is, at delay block 604, the worker thread delays, or sleeps, for a certain amount of time, and then revisits decision block 602. It should be appreciated, that other worker threads may also be executing in parallel, and taking the work requests from the work request queue 510.

If, at decision block 602, the work request queue is not empty, routine 600 executing the thread proceeds to block 606. At block 606, a work request is dequeued from the work request queue 510. At block 608, the worker thread sets its metadata according to information in the selected/dequeued work request. Of course, this transfers the SID of the requesting thread, i.e., the requesting thread the queued the work request, to the working thread, assuming the requesting thread had an SID assigned. At block 610, the worker thread executes according to the work request. Thereafter, the routine 600 returns to decision block 602.

Figure 7:
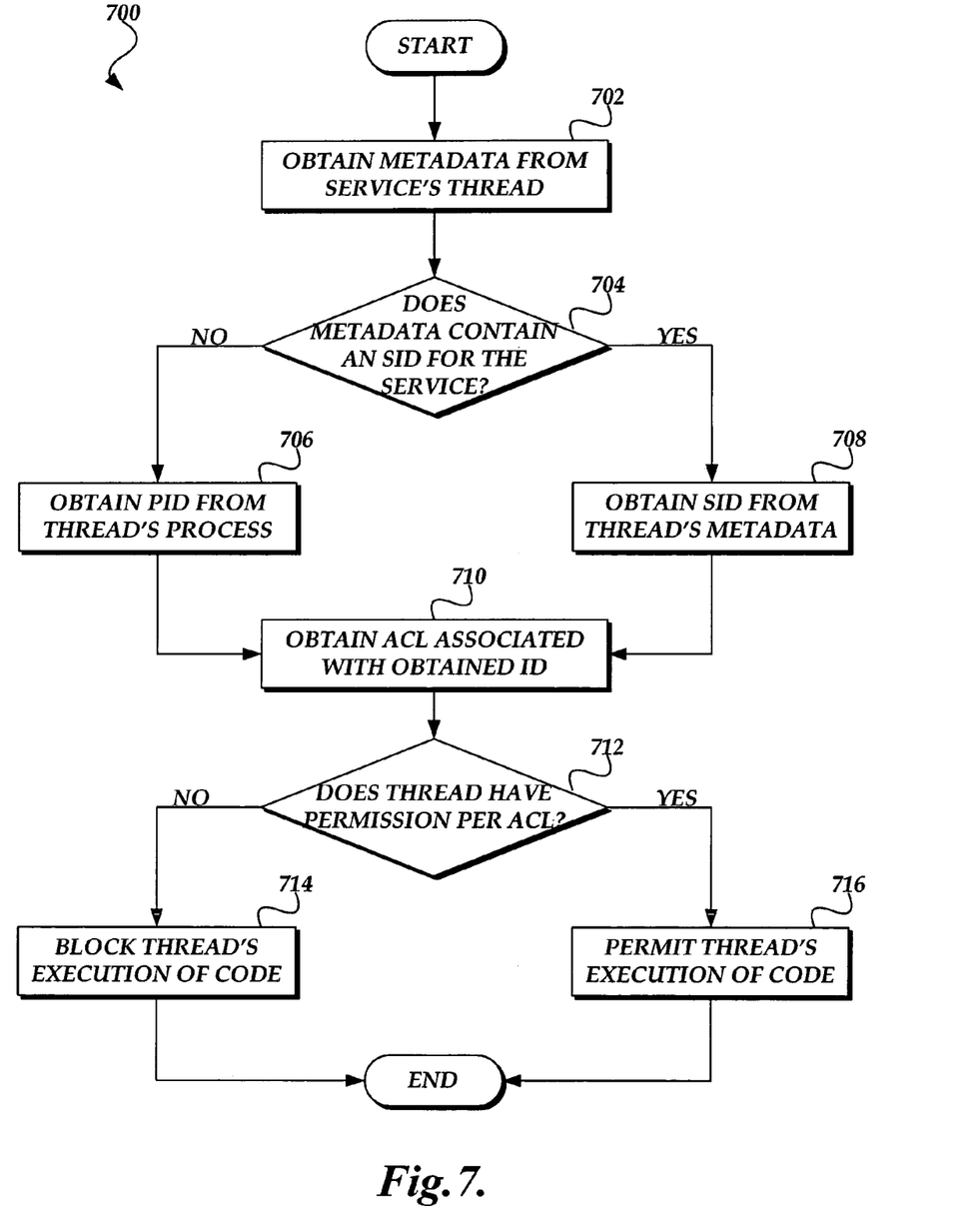
FIG. 7 is a flow diagram illustrating an exemplary routine implemented by a service validation manager to determine whether a particular thread has the permissions to execute operating system service code.

FIG. 7 is a flow diagram illustrating an exemplary routine 700 implemented by a service validation manager to determine whether a particular thread has the permissions to access a resource. Beginning at block 702, the thread's metadata is obtained. At decision block 704, a determination is made as to whether the metadata contains an SID for the thread's corresponding service. If the metadata includes an SID for the service, at block 708 the SID for the service is obtained. Alternatively, if the metadata does not have an SID for the service, at block 706 the SIDs for each service in the process in which the thread is executing is obtained.

At block 710, the ACL associated with the resource being accessed is obtained. The ACL on the resource is checked to see if it has ACEs specifying "identifier" (the "identifier" being either the service's security identifier (SID) from the metadata or one SIDs from the process generally. At block 712, a determination is made as to whether the thread has permission to execute the particular action. If the thread does not have permission to execute the action, at block 714 the execution of that action/code is blocked. Alternatively, if the thread does have permission as per the obtained ACL, the thread is permitted to complete the execution of the action.

While the above description is set forth with regard to all code executed by threads associated with an executing process, the same concept may be generally applied to any subset of code to be executed as long as it can be identified by an identifier like a SID. In this manner, tracking of code execution and/or hardening of a particular segment of code can be realized. Moreover, while illustrative embodiments of the invention have been illustrated and described, it will be appreciated that various changes can be made therein without departing from the spirit and scope of the invention.

The embodiments of the invention in which an exclusive property or privilege is claimed are defined as follows:
1. A computer-readable storage medium storing computer-executable instructions which, when executed on a computer, carry out a method for handling a request for an operating system service, the method comprising:
receiving a request for the execution of an operating system service;
identifying the corresponding operating system service;
obtaining a unique service identifier corresponding to the requested operating system service;
determining whether the operating system service is already loaded in an executing process, and if not, loading the operating system service into an executing process;
determining whether an executing process is available into which the operating system service is loaded, and if not, initializing the execution of a process and loading the operating system service into the now executing process;
generating for the operating system service a service thread within an executing process and initializing storage associated with the service thread with the unique service identifier, the executing process having a process identifier different than the service identifier; and initiating the execution of the service thread.

2. The computer-readable medium of claim 1, wherein the method further comprises obtaining the unique service identifier from a services control manager executing as part of the operating system.

3. The computer-readable medium of claim 1, wherein the requested operating system service is associated with an access control list configured such that a service validation manager executing in the operating system can determine whether actions taken in the execution of the service thread are permissible.

4. The computer-readable medium of claim 1, wherein the operating system is a Microsoft Windows operating system.

5. The computer-readable medium of claim 1, wherein the executing process executes at least one other service.

6. The computer-readable medium of claim 1, wherein the method further comprises:

receiving a request for the execution of a second operating system service;

determining that the second requested operating system service does not have a unique service identifier;

generating a second service thread within the executing process and initializing storage associated with the second thread with the process identifier associated with the executing process; and initiating the execution of the second service thread.

7. A computer system for assigning thread identifiers to threads executing on behalf of an executing process, the computer system comprising:

a processor; and a memory;

wherein the computer system further includes:

an operating system comprising a plurality of operating system services which may be loaded into an executing process and executed as a thread for the executing process; and a services control manager that, in response to a request for the execution of an operating system service:

identifies the corresponding operating system service;

obtains a unique service identifier for identifying the requested operating system service;

determines whether the requested operating system service is already loaded in an executing process, and if not, loads the operating system service into an executing process;

determines whether an executing process is available into which the operating system service is loaded, and if not, initializes the execution of a process and loads the operating system service into the now executing process;

generates a service thread to be executed on behalf of an executing process;

initializes storage associated with the service thread with the unique service identifier; and initiates the execution of the service thread; and a validation manager that, in response to a request from the service thread to access a resource:

accesses the storage to determine, based on the unique storage identifier, whether the service thread is authorized to access the resource, whereby service threads for respective ones of the plurality of operating system services execute within the process with different levels of access to the resource.

8. The computer system of claim 7, wherein the validation manager determines whether the service thread is authorized to access the resource based on an access control list available on the computer system, the access control list indicating whether actions in the execution of the service thread are permissible.

9. The computer system of claim 8, wherein the service thread is operable to initiate a second service thread for executing the operating system service, and wherein the service thread initiates the second service thread by copying its unique service identifier to the storage associated with the second service thread.

10. The computer system of claim 9, wherein the executing process provides a thread pool of worker threads available for use by an operating system service loaded in the process, and wherein the service thread queues a work request with its service identifier to the process such that when a worker thread in the thread pool becomes available, the process initiates the worker thread with the service identifier and begins its execution according to the work request.

11. The computer system of claim 7, wherein the executing process has a process identifier for identifying the executing process.

12. The computer system of claim 11, wherein the service thread is one of a plurality of service threads executed on behalf of the executing process, each of said plurality of service threads having metadata identifying one of the plurality of operating system services with a service identifier.

13. A computer-implemented method for determining whether a service thread executing an operating system service that is loaded into an executing process has permission to perform a specific action, the method comprising each of the following as executed by a computer and prior to carrying out the specific action:

obtaining metadata from the service thread;

obtaining an obtained identifier by:

determining whether the metadata includes a service identifier that uniquely identifies the operating system service;

obtaining the service identifier from the metadata from the service thread as the obtained identifier if the metadata includes a service identifier; and obtaining an identifier associated with the executing process as the obtained identifier if the metadata does not include a service identifier; and obtaining an access control list corresponding to the obtained identifier;

evaluating the access control list to determine whether the operating system service is allowed to perform the specific action; permitting the specific action if it is determined that the service thread is allowed to perform the specific action according to the access control list; and blocking the specific action if it is determined that the service thread is not allowed to perform the specific action according to the access control list.

14. The method of claim 13, wherein the operating system service is among a plurality of operating system services loaded into the executing process and the executing process has a process identifier for identifying the executing process.

* * * * *